US 7,057,713 B2

United States Patent
Elbers et al.

(10) Patent No.: US 7,057,713 B2
(45) Date of Patent: Jun. 6, 2006

(54) METHOD AND DEVICE FOR MEASURING THE FIBER NON-LINEARITY OF AN OPTICAL FIBER IN A DATA TRANSMISSION PATH

(75) Inventors: Jörg-Peter Elbers, München (DE); Christoph Glingener, Feldkirchen-Westerham (DE); Erich Gottwald, Holzkirchen (DE); Christian Scheerer, Ottawa (CA)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/381,832

(22) PCT Filed: Sep. 20, 2001

(86) PCT No.: PCT/DE01/03634

§ 371 (c)(1),
(2), (4) Date: Oct. 7, 2003

(87) PCT Pub. No.: WO02/27292

PCT Pub. Date: Apr. 4, 2002

(65) Prior Publication Data

US 2004/0061846 A1     Apr. 1, 2004

(51) Int. Cl.
*G01N 21/00*     (2006.01)

(52) U.S. Cl. .................................................. 356/73.1
(58) Field of Classification Search ............... 356/73.1; 385/42, 24, 12, 122; 398/9–33
See application file for complete search history.

(56) References Cited

U.S. PATENT DOCUMENTS 6,067,149 A    5/2000  Gripp et al.

FOREIGN PATENT DOCUMENTS

EP     0 819 926     1/1998

*Primary Examiner*—Tu T. Nguyen
(74) *Attorney, Agent, or Firm*—Bell, Boyd & Lloyd LLC

(57) ABSTRACT

A method and device are provided for measuring the non-linear coefficient and/or the dispersion coefficient of an optical fiber in an optical data transmission path by four-wave mixing, wherein at least two pump signals of known intensity with at least two different input frequencies are injected into one end of an optical fiber to be measured, in order to obtain at least two signals with at least two new frequencies by four-wave mixing, with the intensity of the backscattered signals of the new frequencies being measured at the feed side and the non-linear coefficent and/or the dispersion coefficient being determined from the measured intensities.

22 Claims, 2 Drawing Sheets

METHOD AND DEVICE FOR MEASURING THE FIBER NON-LINEARITY OF AN OPTICAL FIBER IN A DATA TRANSMISSION PATH

BACKGROUND OF THE INVENTION

The present invention relates to a method and a device for measuring the non-linear coefficient γ and/or the dispersion coefficient $\beta_2$ of an optical fiber in a data transmission path by four-wave mixing.

The precise knowledge of non-linear effects in optical fibers is particularly necessary in the case of integration of older fibers in an optical data transmission path with high data rates or high power or in the case of a WDM system, due to the signal distortion occurring there.

A similar method and a similar device are known from international patent application WO 98/57138 submitted by the applicant. In this method, however, measurements are required at both ends of the optical fiber in question, including the collection of data at one or the other end of the fiber. This is very expensive, particularly in the case of optical fibers which already have been laid over a number of kilometers, as account must be taken of the corresponding looping, in order to be able to analyze the data together.

An object of the present invention is, therefore, to develop a method and a device, which allow the non-linear coefficient γ and/or the dispersion coefficient $\beta_2$ of an optical fiber to be measured, by measuring at only one end of the optical fiber.

SUMMARY OF THE INVENTION

The intensity-dependent refractive index of the fiber brings about a frequency mixing of optical waves. The mixing process, in which a new addition with a fourth frequency is generated by three incident optical waves (pump signals), is referred to as four wave mixing (FWM), whereby the frequency condition $$f_n = f_i + f_j - f_k \quad \text{(A-1)}$$

must be satisfied with $f_i$, $f_j \neq f_k$. It is designated as an instance of degenerate FWM, when $f_i = f_j$; i.e., 2 pump signals are fed in and (A-1) therefore reduces to $f_n = 2f_i - f_k$.

The following mathematical description describes the propagation of unmodulated waves (CW) with the same polarization status of the waves involved $A_n$ in single mode glass fibers via a system of 4 non-linearly linked differential equations of the type $$\frac{\partial A_n}{\partial z} + \frac{\alpha}{2} A_n = -j\gamma A_n \left\{ |A_n|^2 + 2 \sum_{i=1, i \neq n}^{N} |A_i|^2 \right\} - j\gamma \sum_{n=i+j-k; i, j \neq k} A_i A_j A_k^* \exp(-j\Delta k z) \quad \text{(A-2)}$$

Here z is the direction of propagation, α the fiber attenuation, γ the non-linear coefficient and Δk the wave number difference defined below. The first term in (A-2) describes the self phase and cross phase modulation, the second term the four-wave mixing.

Generally the resulting equation system must be solved numerically. However, representation of the FWM effect allows an approximate solution. If the non-linear power degradation of the channels i, j, k is ignored, because the newly generated power in channel n is only low-level compared with channel powers i, j, k and also the self phase modulation (SPM) and cross phase modulation (XPM) for unmodulated waves are negligible, the following applies $$A_n(z) = -j\gamma D_n A_i(0) A_j(0) A_k^*(0) e^{-\alpha z/2} \frac{1 - e^{-(\alpha + j\Delta k)z}}{\alpha + j\Delta k} \quad \text{(A-3)}$$

with the degeneration factor $$D_n \begin{cases} 1 & f_i = f_j \\ 2 & f_i \neq f_j \end{cases} \quad \text{(A-4)}$$

For the power generated by FWM in the direction of propagation the following then applies $$P_n(L) = \eta(\gamma D_n L_{eff})^2 P_i P_j P_k e^{-\alpha L} \quad \text{(A-5)}$$

with the FWM efficiency $$\eta = \frac{P_n(L, \Delta k)}{P_n(L, \Delta k = 0)} = \frac{\alpha^2}{\alpha^2 + \Delta k^2} \left( 1 + \frac{4 e^{-\alpha L} \sin^2(\Delta k L / 2)}{(1 - e^{-\alpha L})^2} \right) \quad \text{(A-6)}$$

Δk is dominated on dispersive fibers by the dispersion and the following applies when higher order dispersion is disregarded $$\Delta k = -4\pi^2 \beta_2 (f_i - f_k)(f_j - f_k),$$

or for degenerate FWM $$\Delta k = -4\pi^2 \beta_2 (f_i - f_k)^2 \quad \text{(A-7)}$$

The backscattered power $P_{new}^R(\infty)$ due to Rayleigh scatter on an infinite fiber with a newly generated frequency results from the integral of equation (A-5) weighted with a Rayleigh factor $\beta_R$, which designates the proportion of backscattered power from a piece of fiber 1 m long. The assumption of an infinite length of fiber is justified for typical transmission fibers from around 50 km long.

It follows that $$P_{new}^R(\infty) = \beta_R \frac{4\gamma^2 D_n^2 P_i P_j P_k}{12\alpha^3 + 3\alpha \Delta k^2}. \quad \text{(A-8)}$$

If the frequency difference $\Delta f = (f_i - f_k)$ is varied, the following relationship results as a function of this difference, normalized to the backscattered pump power, $\beta_R P_i$ per unit length, with:

$$P_{new}^R(\Delta f) = \frac{\gamma^2 P_i^2}{12\alpha^3 + 48\pi^4 \alpha \beta_2^2 \Delta f^4} \quad \text{(A-9)}$$

Knowledge of the input power of the pump signals and the attenuation constant α, which may, for example, be determined using a separate or the same device via an OTDR (optical time domain reflectometry) method, is now determined by varying the frequency difference of the dispersion coefficient $\beta_2$ and the non-linear coefficient $\gamma$.

In simple terms, the concept according to the present invention shows how, by generating at least two new signals with at least two frequencies via four-wave mixing from at least two known pump signals, knowing the input power of the pump signals and measuring the expected output power of the new signals from the non-linear equations A-8 or A-9 disclosed above, a solvable equation system with two equations with the two unknowns $\gamma$ and $\beta_2$ may be obtained, which gives as a result the values of the non-linear coefficient $\gamma$ and the dispersion coefficient $\beta_2$.

These considerations relate to pump signals with parallel polarization. Also, the possible influence of polarization changes along the fiber may be determined by using a fast polarization actuator in one of the paths between the pump laser and circulator (between 13 and 9 or 14 and 9 in FIG. 3) in the measuring arrangement. This polarization actuator may vary the relative polarization between the pump waves continuously during measurement, so that the polarization dependency of the measurement is averaged out. The lower level of efficiency of four-wave mixing may, in this case, be taken into account by a constant factor known from the literature.

In accordance with this invention concept, the inventor proposes further developing a method for measuring the non-linear coefficient $\gamma$ and/or the dispersion coefficient $\beta_2$ of an optical fiber in a data transmission path by four-wave mixing to the effect that at least two pump signals of known intensity with at least two different input frequencies fi and fk are injected into one end of an optical fiber to be measured, in order to obtain at least two signals with at least two new frequencies fn by four-wave mixing, with the intensity of the backscattered signals of the new frequency fn being measured on the feed side and the non-linear coefficient $\gamma$ and/or the dispersion coefficient $\beta_2$ being determined from this.

The non-linear coefficient $\gamma$ may be determined from a single measurement, if f4–f3 from FIG. 1 is small enough. If $\beta_2$ is also to be determined, at least 2 measurements are required; i.e., at least one of the frequencies f3 or f4 must be varied.

Advantageously, at least one of the input frequencies fi or fk may be varied in successive measurements in the method according to the present invention, in order to obtain different backscattered signals with different new frequencies fn. These signals, of which there are at least two, may then be measured with respect to their intensity and used to determine the non-linear coefficient $\gamma$ and/or the dispersion coefficient $\beta_2$.

As stated above, the pump signals may be unmodulated, modulated and/or pulsed. As such, the dispersion and non-linearity of the optical fiber also may be measured as a function of the location on the fiber, if the backscattered power is measured with time resolution.

Advantageously, the pump signals should either have parallel polarity, whereby the polarization of at least one of the pump signals may be temporarily changed and therefore the dependency of the measured effects of the direction of polarization may be determined or the polarization must be scrambled, which may be necessary in the case of fibers with very low but not zero birefringence in order to create precisely defined conditions for the analysis (factor 0.7 compared with the same polarization for all signals).

The input power of the pump signals must be known for the proposed method. This may be deduced either indirectly via known power settings of the pump lasers or preferably a direct measurement is taken.

The attenuation, defined by the attenuation constant $\alpha$ and the Rayleigh factor $\beta_R$ of the measured optical fiber also must be known directly or indirectly and is preferably determined parallel to the measurement method according to the present invention via an OTDR method ($\alpha$) or simple measurement of the backscattered power ($\beta_R$).

In addition to the method, the inventors also propose a device for measuring the optical fiber non-linearity and/or fiber dispersion in an optical data transmission path with at least one optical fiber, which contains at least the following elements:

devices for generating at least two different frequencies fi and fk;

a device for feeding the pump signals into the optical fiber, of which there is at least one, in the data transmission path;

a device for extracting backscattered signals;

a device for filtering out at least one frequency fn resulting from four-wave mixing;

device for measuring the intensity of the backscattered and filtered frequency fn, of which there is at least one;

a device for controlling the power of the pump signals; and a device for analyzing the non-linearity and/or dispersion of the optical fiber.

An advantageous embodiment of the device may be such that the device for generating at least two different frequencies fi and fk is one or more single or multi-mode lasers, with filters preferably connected after a multi-mode laser and/or the device for feeding the pump signals into the optical fiber, of which there is at least one, in the data transmission path is a circulator, whereby the device for extracting the backscattered signals also may be a circulator, preferably the same circulator.

A bandpass filter also may be used as the device for filtering out at least one frequency fn resulting from four-wave mixing or the device for measuring the intensity of the backscattered and filtered frequency fn, of which there is at least one, may be an optical power meter or a photodiode with appropriate circuit elements.

The inventors also propose that the device for controlling the power of the pump signals and for analyzing the non-linearity and/or dispersion of the optical fibers contains a microprocessor with a program storage device and a control and analysis program.

Also, at least one modulation device may be provided, preferably a Mach-Zehnder modulator or an electroabsorption modulator or direct modulation via the laser flow from at least one pump laser.

Moreover, at least one device may be provided for generating a pulse in at least one pump signal; preferably, an external modulator. Modulation and pulsing are deployed together with time resolution measurement for the high-sensitivity resolution determination of fiber non-linearity.

A further embodiment of the device according to the present invention is such that at least one device for the preferably time-variable polarization of at least one of the pump signals is a polarization actuation element with adjustment constants in the sub-millisecond range.

Additional features and advantages of the present invention are described in, and will be apparent from, the following Detailed Description of the Invention and the Figures.

DETAILED DESCRIPTION OF THE INVENTION

Figure 1:
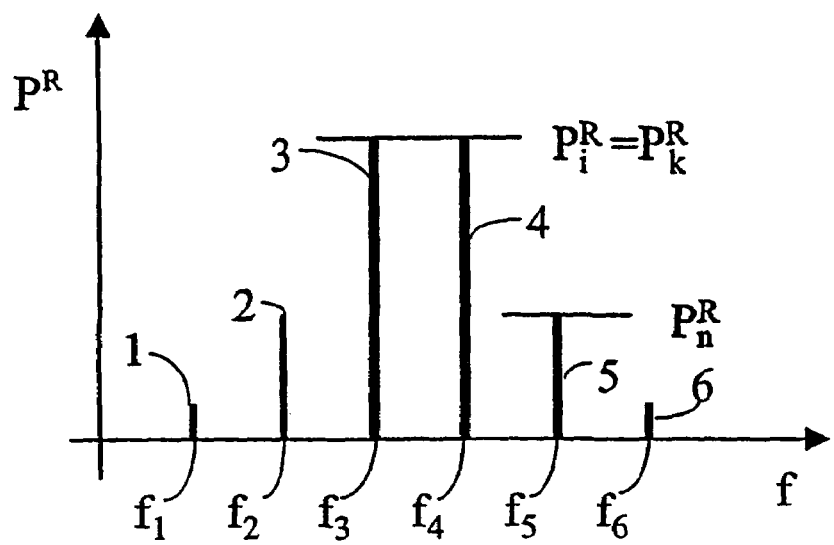
FIG. 1 shows a typical backscattered signal for two pump signals of equal strength.

FIG. 1 shows the signals typically occurring with four-wave mixing with the intensity of the backscattered power $P^R$ over the frequencies f. The two pump waves 3 and 4 with the measured powers PR3 and PR4 of the same intensity backscattered from the fiber generate the two new signals PR2 and PR5 via the known first order four-wave modulation. The second order signals PR1 and PR6 are also shown.

To measure the non-linearity of the fiber in the simplest form, it is basically sufficient to know the intensity values of a first order signal (PR2 or PR5) for at least two values (f4–f3) and to insert them into equation (A-9) with the two unknowns, including the non-linear coefficient $\gamma$ and the dispersion coefficient $\beta_2$, in order to calculate the non-linear coefficient $\gamma$ and the dispersion coefficient $\beta_2$. This is possible due to the non-linear dependency of equation (A-9) on the two coefficients to be determined.

Preferably, therefore, the frequency (i.e., the wavelength of at least one of the pump signals) is varied to obtain different, independent intensity values for the new signals PRn with different frequencies fn obtained via four-wave modulation.

Also, the lasers generating the pump signals either may be set in a controlled fashion at a predefined power level or the current power of the pump laser is measured individually in each instance and included thus in the calculation. Also 3 or more pump signals with different frequencies, or wavelengths, may be used.

Figure 2:
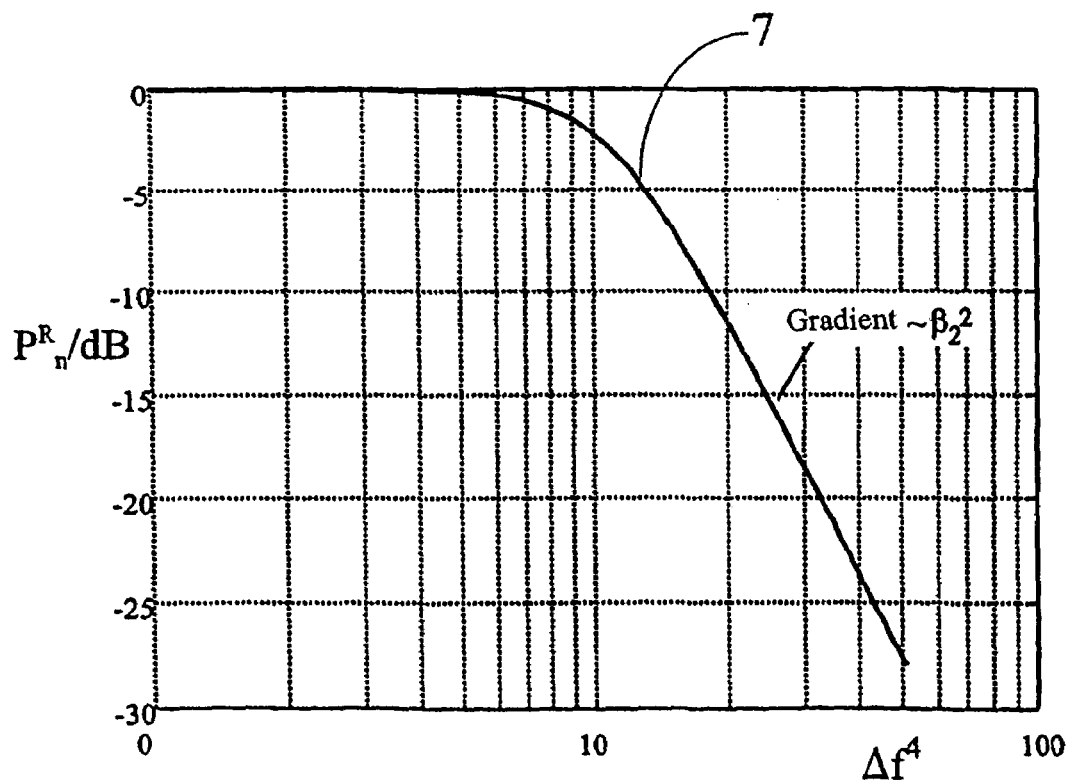
FIG. 2 shows a typical measurement curve for $P^R_n$ as a function of $\Delta f^4$.

A typical measurement curve, in which the relative backscattered power in dB ($P^R_n$) is entered as a function of the frequency difference $\Delta f^4$ from equation A-9, is shown in FIG. 2. The gradient of the measurement curve 7 in the linear section is proportional to the square of the dispersion coefficient $\beta_2^2$.

Figure 3:
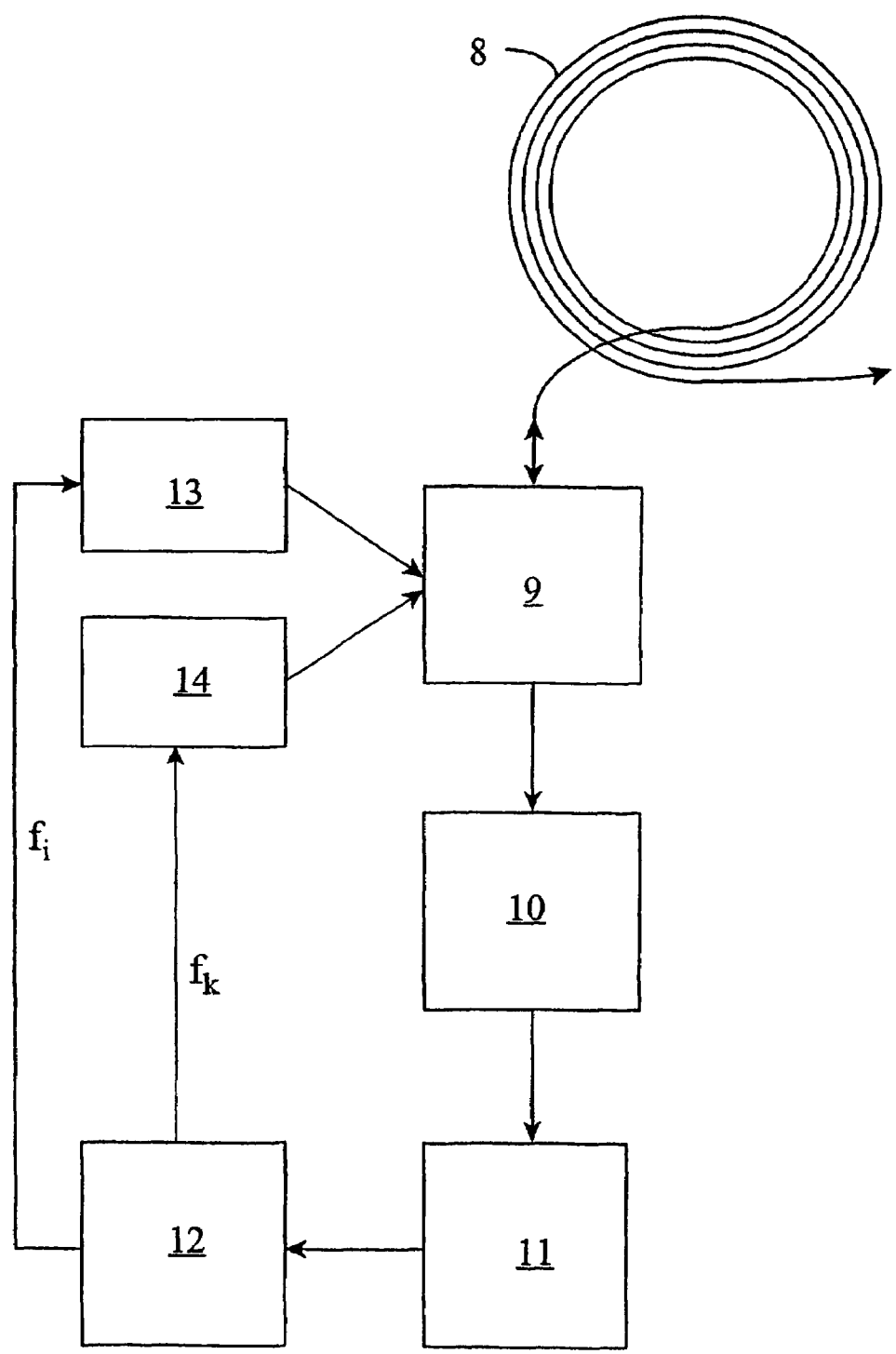
FIG. 3 shows a single end measurement arrangement according to the present invention.

FIG. 3 shows an example of a measurement device according to the present invention for the non-linear coefficient $\gamma$ and the dispersion coefficient $\beta_2$, resulting without feedback of measurement values or information from the other end of the optical fiber.

In addition to the power measurements for the backscattered pump signals and the attenuation of the optical fiber 8 not shown here, the measurement device includes a circulator 9, via which the pump signals with frequencies fi and fk of the two pump lasers 13 and 14 are fed into the optical fibers 8. The backscattered light is also fed from the optical fiber via the circulator to a bandpass filter 10 for the frequency of the new signal under examination with the frequency fn and the power of this backscattered frequency is then measured in a power measurement device 11.

The power values measured in this way for at least two backscattered new frequencies fn are fed to an analysis unit 12, in which the non-linear coefficient $\gamma$ and the dispersion coefficient $\beta_2$ are determined via corresponding programs. This analysis unit 12 is also used in the measurement device shown to control the pump lasers 13 and 14 in respect of their intensity and/or in respect of their frequency.

Overall, therefore, the present invention proposes a method and a device for measuring the non-linear coefficient $\gamma$ and/or the dispersion coefficient $\beta_2$ of an optical fiber in an optical data transmission path, in which the non-linear coefficient $\gamma$ and/or the dispersion coefficient $\beta_2$ is deduced from the change in the backscattered power of at least one new signal generated by the four-wave mixing of two pump signals by measuring at only one end of the optical fiber.

It is evident that the above-mentioned features of the present invention may be used not only in the combination specified in each instance but also in other combinations or alone, without departing from the scope of the invention.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for measuring at least one of a non-linear coefficient and a dispersion coefficient of an optical fiber in an optical data transmission path by four-wave mixing, the method comprising the steps of:
    injecting at least two pump signals of known intensity with at least two different input frequencies into one end of an optical fiber to be measured in order to obtain at least two signals with at least two new frequencies by four-wave mixing;
    varying at least one of the input frequencies with successive measurements in order to obtain backscattered signals with different new frequencies;
    measuring an intensity of the backscattered signals of the new frequencies at a feed side; and
    determining at least one of the respective non-linear coefficient and the respective dispersion coefficient from the measured intensities.

2. A method for measuring at least one of a non-linear coefficient and a dispersion coefficient of an optical fiber as claimed in claim 1, wherein the intensity of at least two backscattered signals is measured with different new frequencies.

3. A method for measuring at least one of a non-linear coefficient and a dispersion coefficient of an optical fiber as claimed in claim 1, wherein at least one of the pump signals is unmodulated.

4. A method for measuring at least one of a non-linear coefficient and a dispersion coefficient of an optical fiber as claimed in claim 1, wherein at least one of the at least two injected pump signals is modulated.

5. A method for measuring at least one of a non-linear coefficient and a dispersion coefficient of an optical fiber as claimed in claim 4, wherein the dispersion coefficient and the non-linear coefficient of the optical fiber are measured as a function of a location on the optical fiber.

6. A method for measuring at least one of a non-linear coefficient and a dispersion coefficient of an optical fiber as claimed in claim 1, wherein at least one of the at least two injected pump signals is pulsed.

7. A method for measuring at least one of a non-linear coefficient and a dispersion coefficient of an optical fiber as claimed in claim 1, wherein the at least two injected pump signals have parallel polarization.

8. A method for measuring at least one of a non-linear coefficient and a dispersion coefficient of an optical fiber as claimed in claim 1, wherein at least one of the at least two injected pump signals has scrambled polarization.

9. A method for measuring at least one of a non-linear coefficient and a dispersion coefficient of an optical fiber as claimed in claim 1, wherein polarization of at least one of the at least two injected pump signals changes temporarily such that a dependency of measured effects on a direction of polarization is measured.

10. A method for measuring at least one of a non-linear coefficient and a dispersion coefficient of an optical fiber as claimed in claim 1, the method further comprising the step of measuring an input power of the at least two injected pump signals.

11. A method for measuring at least one of a non-linear coefficient and a dispersion coefficient of an optical fiber as claimed in claim 1, the method further comprising the step of measuring an attenuation of the measured optical fiber according to an OTDR method.

12. A device for measuring at least one of optical fiber non-linearity and fiber dispersion in an optical data transmission path with at least one optical fiber, comprising:
- devices for generating at least two optical signals with different frequencies;
- a device for feeding pump signals into the at least one optical fiber in the data transmission path;
- a device for varying at least one of the input frequencies with successive measurements in order to obtain backscattered signals with different new frequencies;
- a device for extracting the backscattered signals;
- a device for filtering out at least one frequency resulting from four-wave mixing;
- a device for measuring both an intensity of the backscattered signals and the at least one filtered frequency;
- a device for controlling power of the pump signals; and
- a device for analyzing at least one of the optical fiber non-linearity and the fiber dispersion of the optical fiber.

13. A device for measuring at least one of optical fiber non-linearity and fiber dispersion in an optical data transmission path as claimed in claim 12, wherein the devices for generating at least two optical signals with different frequencies are one of a single-mode laser and a multi-mode laser, with filters connected after the multi-mode laser.

14. A device for measuring at least one of optical fiber non-linearity and fiber dispersion in an optical data transmission path as claimed in claim 12, wherein the device for feeding the pump signals into the at least one optical fiber is a circulator.

15. A device for measuring at least one of optical fiber non-linearity and fiber dispersion in an optical data transmission path as claimed in claim 12, wherein the device for extracting the backscattered signals is a circulator.

16. A device for measuring at least one of optical fiber non-linearity and fiber dispersion in an optical data transmission path as claimed in claim 12, wherein the device for extracting the backscattered signals is an optical directional coupler.

17. A device for measuring at least one of optical fiber non-linearity and fiber dispersion in an optical data transmission path as claimed in claim 12, wherein the device for filtering out at least one frequency resulting from four-wave mixing is a bandpass filter.

18. A device for measuring at least one of optical fiber non-linearity and fiber dispersion in an optical data transmission path as claimed in claim 12, wherein the device for measuring both the intensity of the backscattered signals and the at least one filtered frequency is one of an optical power meter and a photodiode with appropriate circuit elements.

19. A device for measuring at least one of optical fiber non-linearity and fiber dispersion in an optical data transmission path as claimed in claim 12, wherein the device for controlling the power of the pump signals and the device for analyzing the at least one of the optical fiber non-linearity and the fiber dispersion of the optical fiber contain a microprocessor with a program storage unit and a control and analysis program.

20. A device for measuring at least one of optical fiber non-linearity and fiber dispersion in an optical data transmission path as claimed in claim 12, further comprising an external modulator for modulating at least one of the pump signals.

21. A device for measuring at least one of optical fiber non-linearity and fiber dispersion in an optical data transmission path as claimed in claim 12, further comprising an external modulator for pulsing at least one of the pump signals.

22. A device for measuring at least one of optical fiber non-linearity and fiber dispersion in an optical data transmission path as claimed in claim 12, further comprising a polarization actuator with adjustment constants in a sub-millisecond range for temporary polarization of at least one of the pump signals.

* * * * *